(12) United States Patent
Harada et al.

(10) Patent No.: US 10,760,681 B2
(45) Date of Patent: Sep. 1, 2020

(54) HYDRAULIC CONTROL DEVICE

(71) Applicant: HONDA MOTOR CO., LTD., Minato-ku, Tokyo (JP)

(72) Inventors: Masamichi Harada, Wako (JP); Kyohei Sakagami, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 224 days.

(21) Appl. No.: 16/056,622

(22) Filed: Aug. 7, 2018

(65) Prior Publication Data
US 2019/0048868 A1 Feb. 14, 2019

(30) Foreign Application Priority Data
Aug. 10, 2017 (JP) .................. 2017-155239

(51) Int. Cl.
| F15B 11/17 | (2006.01) |
|---|---|
| F16H 61/00 | (2006.01) |
| F04B 49/20 | (2006.01) |
| F16H 59/72 | (2006.01) |
| F15B 11/16 | (2006.01) |
| F04B 49/02 | (2006.01) |

(52) U.S. Cl.
CPC ......... *F16H 61/0031* (2013.01); *F04B 49/20* (2013.01); *F15B 11/17* (2013.01); *F04B 49/02* (2013.01); *F15B 11/165* (2013.01); *F15B 2211/20576* (2013.01); *F15B 2211/6651* (2013.01); *F16H 59/72* (2013.01); *Y10T 477/624* (2015.01); *Y10T 477/6243* (2015.01); *Y10T 477/688* (2015.01)

(58) Field of Classification Search
CPC ........... Y10T 477/624; Y10T 477/6243; Y10T 477/688; F16H 61/0031; F16H 59/72; F16H 61/662; F16H 61/664; F15B 11/17; F15B 2211/6651; F15B 2211/20576; F15B 11/165; F04B 49/20; F04B 49/02
USPC ........................................... 701/60
See application file for complete search history.

(56) References Cited

U.S. PATENT DOCUMENTS

| 9,777,828 | B2 | 10/2017 | Yoshitani et al. |
|---|---|---|---|
| 10,473,126 | B2* | 11/2019 | Harada ............... F16H 61/0031 |
| 2018/0106363 | A1 | 4/2018 | Katakura et al. |
| 2018/0119800 | A1 | 5/2018 | Shimizu et al. |
| 2019/0048867 | A1* | 2/2019 | Harada ............... F16H 61/0031 |

FOREIGN PATENT DOCUMENTS

| JP | 2015-200369 | 11/2015 |
|---|---|---|
| JP | 2016-183765 | 10/2016 |
| JP | 2016-183766 | 10/2016 |
| JP | 2017-032063 | 2/2017 |
| WO | 2014/097345 | 6/2014 |

* cited by examiner

*Primary Examiner* — Roger L Pang
(74) *Attorney, Agent, or Firm* — Amin, Turocy & Watson, LLP (57) ABSTRACT

In a control unit of a hydraulic control device, a vehicle state grasping unit grasps a vehicle state of a vehicle, and an output determination unit determines whether an operation point depending on the vehicle state that is decided by an operation point decision unit is over a discharging capability limit line. A pump controller stops a second pump or decreases a rotation number if the output determination unit determines that the operation point is over the discharging capability limit line.

6 Claims, 7 Drawing Sheets

HYDRAULIC CONTROL DEVICE

CROSS-REFERENCE TO RELATED APPLICATION

This application is based upon and claims the benefit of priority from Japanese Patent Application No. 2017-155239 filed on Aug. 10, 2017, the contents of which are incorporated herein by reference.

BACKGROUND OF THE INVENTION

Field of the Invention

The present invention relates to a hydraulic control device that has, between a first pump and a hydraulic operation unit, a second pump and a check valve connected in parallel, and that supplies first oil from the first pump to the hydraulic operation unit through the check valve, or pressurizes the first oil with the second pump and supplies the first oil that has been pressurized to the hydraulic operation unit as second oil.

Description of the Related Art

For example, Japanese Laid-Open Patent Publication No. 2015-200369 discloses a hydraulic control device in a transmission of a vehicle that has, between a first pump (mechanical pump) and a hydraulic operation unit of the transmission, a second pump (electric pump) and a check valve connected in parallel. In this case, when an engine is started, first of all, first oil is supplied from the first pump to the hydraulic operation unit through the check valve. After that, the second pump is driven to pressurize the first oil that is supplied from the first pump and supplies the first oil that is pressurized from the second pump to the hydraulic operation unit as second oil.

SUMMARY OF THE INVENTION

Incidentally, in a case of controlling the driving of the second pump in accordance with a request output depending on a vehicle state, if the request output is beyond the discharging capability of the second pump, it is necessary to supply the first oil from the first pump to the hydraulic operation unit through the check valve in order to make up for the shortage. The request that is beyond the discharging capability of the second pump is made, for example, in a case where the supply of the oil with high pressure to a transmission is requested or a case where a quick shift operation is requested. In such cases, if the second pump is continuously driven with the check valve open, the second pump does wasteful work, and as a result, the fuel efficiency of the vehicle deteriorates.

In addition, when the first pump and the second pump are operated together, hunting, that is, repeated opening and closing of the check valve may occur. As a result, there is a concern that the pressure of the oil to be supplied to the hydraulic operation unit varies to influence the operation of the hydraulic operation unit.

The present invention is an improvement of the hydraulic control device according to Japanese Laid-Open Patent Publication No. 2015-200369, and an object is to provide a hydraulic control device that supplies the oil to a hydraulic control unit as appropriate in accordance with a vehicle state so as to avoid the deterioration in fuel efficiency of the vehicle, and that prevents the hunting of the check valve so as to suppress the variation in pressure of the oil to be supplied to the hydraulic operation unit.

The present invention relates to a hydraulic control device including, between a first pump and a hydraulic operation unit of a transmission, a second pump and a check valve connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil.

In order to achieve the above object, the hydraulic control device includes a vehicle state grasping unit, an output determination unit, and a pump controller.

The vehicle state grasping unit is configured to grasp a vehicle state of a vehicle including the transmission. The output determination unit is configured to determine whether a request output for the second pump depending on the vehicle state is beyond a discharging capability of the second pump. The pump controller is configured to stop the second pump or decrease a rotation number of the second pump if the output determination unit determines that the request output is beyond the discharging capability.

If the request output is beyond the discharging capability, the second pump is stopped or the rotation number is decreased; therefore, the oil can be supplied to the hydraulic operation unit as appropriate in accordance with the vehicle state. Thus, the deterioration in fuel efficiency of the vehicle can be avoided.

In addition, if the request output is beyond the discharging capability, the first pump supplies the first oil to the hydraulic operation unit through the check valve to make up for the shortage with respect to the request output. In this case, the second pump is stopped or set to the low-rotation state. Therefore, hunting of the check valve is prevented and variation in pressure of the oil to be supplied to the hydraulic operation unit can be suppressed.

Here, the hydraulic control device further includes an operation point decision unit configured to calculate a request discharging pressure corresponding to a request value of a discharging pressure of the second pump and a request flow rate corresponding to a request value of a flow rate of the second oil on a basis of the vehicle state, and decide an operation point of the second pump based on the request discharging pressure and the request flow rate corresponding to the request output by using a map expressing a relation between the discharging pressure and the flow rate.

In this case, the output determination unit is configured to determine whether the operation point is over a discharging capability limit line corresponding to a limit line of a range where the second pump can be operated in the map. In addition, the pump controller is configured to stop the second pump or decrease the rotation number of the second pump if the output determination unit determines that the operation point is over the discharging capability limit line.

Thus, if the operation point is over the discharging capability limit line, the second pump is stopped or set to the low-rotation state; therefore, the second pump can be operated as appropriate in accordance with the request output.

Moreover, the operation point decision unit may be configured to calculate the request discharging pressure on a basis of a pressure of oil to be supplied to the hydraulic operation unit, and a pressure of the first oil, and calculate the request flow rate by adding a leak amount of the oil in the hydraulic operation unit and a leak amount of the oil between the second pump and the hydraulic operation unit to the flow rate of the oil requested by the hydraulic operation unit. Thus, the output determination unit can perform the determination process accurately.

In addition, the map may include a plurality of discharging capability limit lines depending on oil temperatures of the second oil, and the output determination unit may be configured to determine whether the operation point is over the discharging capability limit line depending on the oil temperature of the second oil at the operation point. Thus, the determination process can be performed as appropriate depending on the oil temperature.

Note that the discharging capability limit line is configured to change depending on a pressure of third oil to be supplied from the first pump to another hydraulic operation unit that is lower in pressure than the hydraulic operation unit. Therefore, by taking the pressure of the third oil into consideration, the operation point can be decided suitably.

Furthermore, the output determination unit may be configured to determine whether a change of the request output over time is more than response performance of the second pump, and if the output determination unit determines that the change of the request output over time is more than the response performance, the pump controller may be configured to stop the second pump or decrease the rotation number of the second pump. Thus, even if the request output changes, the second pump can be operated as appropriate in accordance with the request output.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a hydraulic control device according to the present invention will hereinafter be described in detail with reference to the attached drawings.

1. Structure of the Present Embodiment

Figure 1:
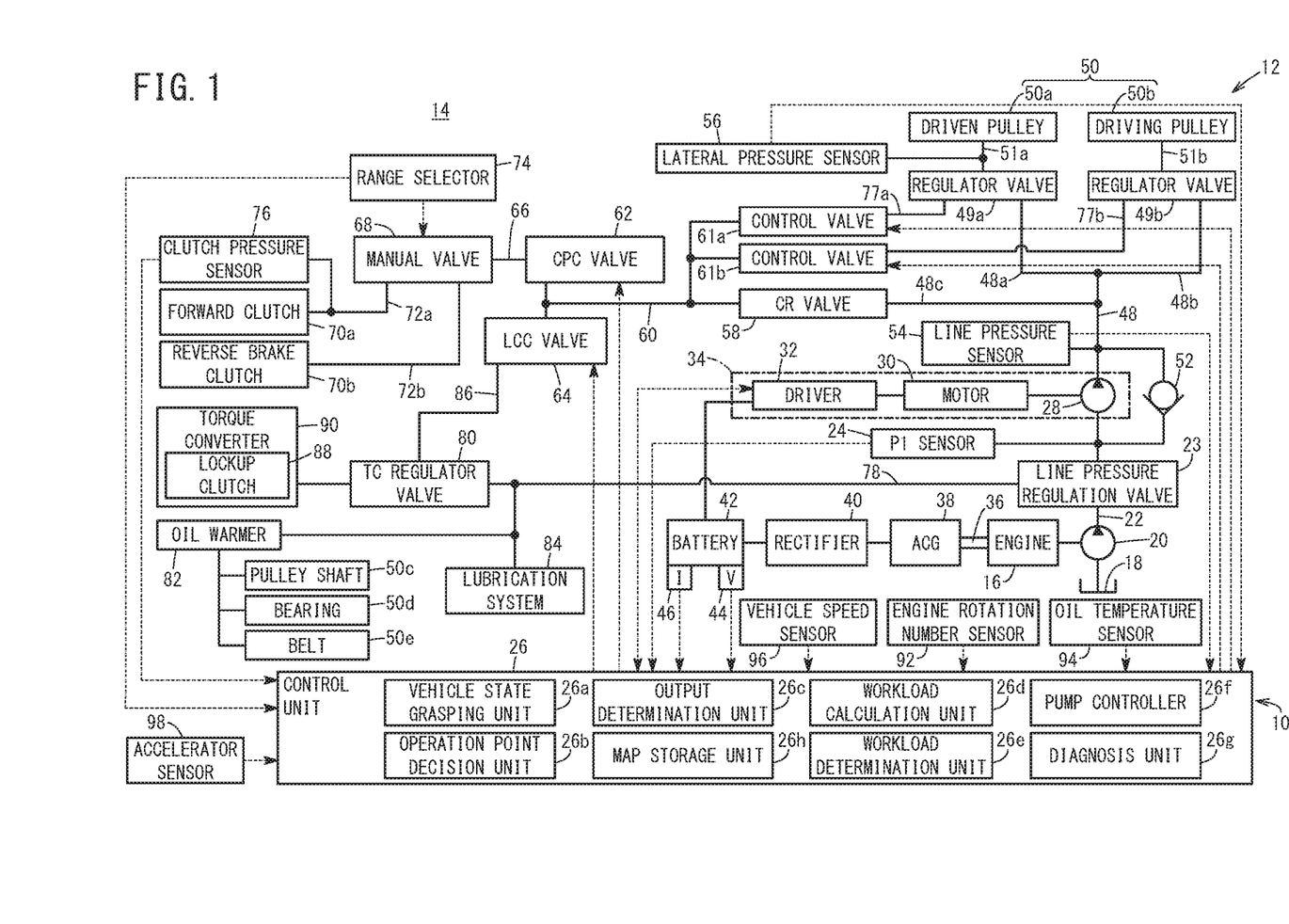
FIG. 1 is a structure diagram of a hydraulic control device according to the present embodiment.

FIG. 1 is a structure diagram of a hydraulic control device 10 according to the present embodiment. The hydraulic control device 10 is used in, for example, a vehicle 14 including a transmission 12 corresponding to a continuously variable transmission (CVT).

The hydraulic control device 10 includes a first pump (mechanical pump) 20 that is driven by an engine 16 of the vehicle 14 and pumps up oil (hydraulic oil) stored in a reservoir 18 and transfers the oil with pressure. An output side of the first pump 20 is connected to an oil passage 22. The oil that is transferred with pressure from the first pump 20 flows as first oil in the oil passage 22. In the middle of the oil passage 22, a line pressure regulation valve 23 corresponding to a spool valve is provided.

In the oil passage 22, an output pressure sensor (P1 sensor) 24 is disposed downstream of the line pressure regulation valve 23. The output pressure sensor 24 sequentially detects a pressure P1 of the first oil (the output pressure of the first pump 20) flowing in the oil passage 22, and sequentially outputs a detection signal expressing the detected output pressure P1 to a control unit 26 that will be described later. On the downstream side in the oil passage 22, a second pump 28 that is smaller in capacity than the first pump 20 is connected.

The second pump 28 is an electric pump that is driven by a rotation of a motor 30 included in the vehicle 14, and that outputs second oil, or the first oil that is supplied through the oil passage 22. In this case, the second pump 28 can pressurize the first oil that is supplied, and transfer the first oil that has been pressurized as the second oil. The motor 30 rotates under a control of a driver 32. The driver 32 controls the driving of the motor 30 on the basis of a control signal supplied from the control unit 26, and moreover, sequentially outputs a signal expressing a driving state of the motor 30 (for example, a rotation number (rotation speed) Nem of the motor 30 in accordance with a rotation number (rotation speed) Nep of the second pump 28) to the control unit 26. The second pump 28, the motor 30, and the driver 32 form an electric pump unit 34.

On the other hand, an alternating-current power generator (ACG) 38 is connected to a crankshaft 36 of the engine 16. The ACG 38 generates power by a rotation of the crankshaft 36 as the engine 16 is driven. The alternating-current power generated by the ACG 38 is rectified by a rectifier 40, and a battery 42 is charged with the rectified power. The battery 42 includes a voltage sensor 44 that detects a voltage V of the battery 42, and a current sensor 46 that detects a current I flowing from the battery 42. The voltage sensor 44 sequentially detects the voltage V of the battery 42, and sequentially outputs the detection signal expressing the detected voltage V to the control unit 26. The current sensor 46 sequentially detects the current I flowing from the battery 42, and sequentially outputs the detection signal expressing the detected current I to the control unit 26. The driver 32 is driven by the power supplied from the battery 42.

An output side of the second pump 28 is connected to an oil passage 48. The oil passage 48 is branched into two oil passages 48a, 48b on the downstream side. The one oil passage 48a is connected through a regulator valve 49a and an oil passage 51a to a driven pulley 50a included in a continuously variable transmission mechanism 50 of the transmission 12. The other oil passage 48b is connected through a regulator valve 49b and an oil passage 51b to a driving pulley 50b included in the continuously variable transmission mechanism 50.

Between the two oil passages 22, 48, a check valve 52 and the second pump 28 are connected in parallel. The check valve 52 is a non-return valve provided to bypass the second pump 28, and allows the oil (first oil) to flow from the oil passage 22 on the upstream side to the oil passage 48 on the downstream side, and prevents the oil (second oil) from flowing from the oil passage 48 on the downstream side to the oil passage 22 on the upstream side.

A line pressure sensor 54 is disposed in the oil passage 48. The line pressure sensor 54 sequentially detects a pressure (line pressure) PH of the oil flowing in the oil passage 48, and sequentially outputs the detection signal expressing the detected line pressure PH to the control unit 26. In the oil passage 51a, a lateral pressure sensor 56 is disposed. The lateral pressure sensor 56 detects a pressure of the oil to be supplied to the driven pulley 50a (a pulley pressure corresponding to the lateral pressure of the driven pulley 50a).

A CR valve 58 is connected to the downstream side of an oil passage 48c that is branched from the oil passage 48. The upstream side of the CR valve 58 is connected to the oil passage 48c, and the downstream side of the CR valve 58 is connected to two control valves 61a, 61b, a CPC valve 62, and an LCC valve 64 through an oil passage 60. The CR valve 58 is a reducing valve. The CR valve 58 reduces the pressure of the oil (second oil) supplied from the oil passage 48c, and supplies the oil with the reduced pressure to the control valves 61a, 61b, the CPC valve 62, and the LCC valve 64 through the oil passage 60.

The upstream side of the CPC valve 62 is connected to the oil passage 60, and the downstream side thereof is connected to a manual valve 68 through an oil passage 66. The CPC valve 62 is a solenoid valve for a forward clutch 70a and a reverse brake clutch 70b. In this case, while the control signal is supplied from the control unit 26 to make current flow in the solenoid, the CPC valve 62 is open to connect the oil passages 60, 66 to each other and thus, the oil is supplied to the manual valve 68.

The upstream side of the manual valve 68 is connected to the oil passage 66, and the downstream side thereof is connected to the forward clutch 70a through an oil passage 72a and moreover connected to the reverse brake clutch 70b through an oil passage 72b. The manual valve 68 is a spool valve. When a driver operates a range selector 74 provided near the driver's seat in the vehicle 14 to select any one of shift ranges such as P (parking), R (reverse), N (neutral), and D (forward, drive), the spool that is not shown is moved by a predetermined amount in an axial direction in accordance with the selected shift range. Thus, the manual valve 68 supplies the oil that is supplied through the oil passage 66, to the forward clutch 70a through the oil passage 72a, so that the vehicle 14 can travel in a forward direction. Alternatively, the manual valve 68 supplies the oil that is supplied through the oil passage 66, to the reverse brake clutch 70b through the oil passage 72b, so that the vehicle 14 can travel in a reverse direction. In the middle of the oil passage 72a, a clutch pressure sensor 76 is provided. The clutch pressure sensor 76 detects the pressure of the oil supplied to the oil passage 72a (a clutch pressure).

Each of the control valves 61a, 61b is a normally open electromagnetic valve with a solenoid. The control valves 61a, 61b are closed while the control signal (current signal) is supplied from the control unit 26 and current flows in the solenoid, and on the other hand, the control valves 61a, 61b are open while current does not flow in the solenoid.

The one control valve 61a is a solenoid valve for the driven pulley 50a, and when the valve is open, the oil supplied from the CR valve 58 through the oil passage 60 is supplied to the regulator valve 49a through an oil passage 77a. The other control valve 61b is a solenoid valve for the driving pulley 50b, and when the valve is open, the oil supplied from the CR valve 58 through the oil passage 60 is supplied to the regulator valve 49b through an oil passage 77b.

Therefore, the one regulator valve 49a uses the pressure of the oil supplied from the control valve 61a through the oil passage 77a, as a pilot pressure. If the line pressure PH of the oil supplied through the oil passages 48, 48a is more than or equal to a predetermined pressure, the regulator valve 49a is open to supply the oil to the driven pulley 50a through the oil passage 51a. In addition, the other regulator valve 49b uses the pressure of the oil supplied from the control valve 61b through the oil passage 77b, as a pilot pressure. If the line pressure PH of the oil supplied through the oil passages 48, 48b is more than or equal to the predetermined pressure, the regulator valve 49b is open to supply the oil to the driving pulley 50b through the oil passage 51b. The control valves 61a, 61b can regulate the pressure of the oil output to the oil passages 77a, 77b, respectively.

To an oil passage 78 branched from the oil passage 22 through the line pressure regulation valve 23, a hydraulic operation unit (another hydraulic operation unit) of a low-pressure system is connected. To the hydraulic operation unit, the first oil is supplied through the oil passage 78. The line pressure regulation valve 23 is a spool valve. The line pressure regulation valve 23 normally connects between the first pump 20, and the second pump 28 and the check valve 52 through the oil passage 22, and by a displacement of the spool that is not shown, connects between the oil passage 22 and the oil passage 78 so that the first oil flows to the oil passage 78. The hydraulic operation unit of the low-pressure system includes a TC regulator valve 80, an oil warmer 82, a lubrication system 84 for the transmission 12, and the like that are connected to the downstream side of the oil passage 78. The TC regulator valve 80 is connected to the LCC valve 64 through an oil passage 86, and the downstream side of the TC regulator valve 80 is connected to a torque converter 90 incorporating a lockup clutch 88.

The LCC valve 64 is a solenoid valve for the lockup clutch 88. While the control signal is supplied from the control unit 26 to make current flow in the solenoid, the LCC valve 64 is open to connect the oil passages 60, 86 to each other, and thus the oil is supplied to the TC regulator valve 80. The TC regulator valve 80 is a spool valve. When the spool that is not shown is operated in the axial direction in accordance with the pressure of the oil supplied from the LCC valve 64 through the oil passage 86, the pressure of the first oil supplied through the oil passage 78 is reduced and the first oil with the reduced pressure is supplied to the torque converter 90 and the lockup clutch 88.

The oil warmer 82 warms up the first oil supplied from the oil passage 78 to a predetermined temperature, and supplies the first oil that is warmed to a pulley shaft 50c, a bearing 50d, and a belt 50e included in the continuously variable transmission mechanism 50. The lubrication system 84 lubricates various components such as bearings and gears in the transmission 12.

Note that in the line pressure regulation valve 23, the pressure of the first oil flowing in the oil passage 78 may be lower than the output pressure P1 of the first oil flowing in the second pump 28 and the check valve 52 through the oil passage 22. Therefore, in the description below, the first oil flowing in the oil passage 78 may be referred to as third oil and the pressure of the third oil may be referred to as a pressure P3.

The hydraulic control device 10 further includes an engine rotation number sensor 92, an oil temperature sensor 94, a vehicle speed sensor 96, an accelerator sensor 98, and the control unit 26. The engine rotation number sensor 92 sequentially detects the engine rotation number New of the engine 16 in accordance with the rotation number Nmp of the first pump 20, and sequentially outputs the detection signal expressing the detected engine rotation number New (rotation number Nmp) to the control unit 26. The oil temperature sensor 94 sequentially detects a temperature (oil temperature) To of the first oil or the second oil, and sequentially outputs the detection signal expressing the detected oil temperature To to the control unit 26. The vehicle speed sensor 96 sequentially detects a vehicle speed Vs of the vehicle 14, and sequentially outputs the detection signal expressing the detected vehicle speed Vs to the control unit 26. The accelerator sensor 98 sequentially detects the opening of an accelerator pedal (not shown) that is operated by the driver, and sequentially outputs the detection signal expressing the detected opening to the control unit 26.

The control unit 26 is a microcomputer such as a CPU functioning as a transmission control unit (TCU) that controls the transmission 12 or an engine control unit (ECU) that controls the engine 16. The control unit 26 achieves functions of a vehicle state grasping unit 26a, an operation point decision unit 26b, an output determination unit 26c, a workload calculation unit 26d, a workload determination unit 26e, a pump controller 26f, and a diagnosis unit 26g by reading and executing programs stored in a storage unit that is not shown.

The vehicle state grasping unit 26a grasps a vehicle state of the vehicle 14 (for example, a vehicle travel state of the vehicle 14) on the basis of detection results from the above sensors. The vehicle state includes a hydraulic control state by the hydraulic control device 10. The operation point decision unit 26b obtains a request output for the second pump 28 on the basis of a process result in the vehicle state grasping unit 26a, and decides an operation point of the second pump 28 in accordance with the obtained request output by using various maps stored in a map storage unit 26h. The output determination unit 26c determines whether the operation point decided in the operation point decision unit 26b is beyond (exceeds) the discharging capability of the second pump 28 by using each map in the map storage unit 26h.

Note that the details of the maps stored in the map storage unit 26h will be described below. The request that is beyond the discharging capability of the second pump 28 is made in, for example, a case where the supply of the oil with high pressure to the driven pulley 50a and the driving pulley 50b in the continuously variable transmission mechanism 50 is requested or a case where a quick shift operation is requested.

The workload calculation unit 26d calculates the workload to be cut in the first pump 20 (the amount of workload cut) when supply of the first oil from the first pump 20 to the continuously variable transmission mechanism 50 through the check valve 52 is switched to supply of the second oil from the second pump 28 to the continuously variable transmission mechanism 50.

Note that the switch between the first oil and the second oil to the continuously variable transmission mechanism 50 is achieved by opening and closing the check valve 52. That is to say, when the amount of discharge (flow rate) of the second oil from the second pump 28 exceeds the flow rate of the first oil (the amount of discharge of the first oil from the first pump 20) that passes the check valve 52, the pressure of the oil (the line pressure PH) on the oil passage 48 side in the check valve 52 becomes higher than the pressure of the oil (the output pressure P1) on the oil passage 22 side. Thus, the check valve 52 is closed and the supply of the first oil from the first pump 20 to the continuously variable transmission mechanism 50 and the like through the check valve 52 and the oil passage 48 is switched to the supply of the second oil from the second pump 28 to the continuously variable transmission mechanism 50 and the like through the oil passage 48. As a result, the flow of the first oil to the oil passage 48 is stopped and the second pump 28 transfers the second oil with pressure to the continuously variable transmission mechanism 50 and the like. In a case where the amount of discharge of the second pump 28 is reduced due to the stop or low-rotation state of the second pump 28, for example, the check valve 52 is opened to supply the first oil to the continuously variable transmission mechanism 50.

The workload determination unit 26e determines whether the amount of workload loss based on the amount of power (workload of the generating power by the ACG 38) generated in order to make up for the power consumed by the operation of the motor 30 in the ACG 38 is more than the amount of workload cut. Since the ACG 38 generates power to be supplied to the entire vehicle 14, it is difficult to calculate only the workload necessary for the motor 30 (second pump 28) in the amount of power generated by the ACG 38. Therefore, in the description below in the present embodiment, only the amount of power to be consumed in the second pump 28 is handled as the amount of power generated by the ACG 38 as (workload of the generating power by the ACG 38)=(power consumed by the second pump 28)/(power generation efficiency of the ACG 38).

The pump controller 26f sets a command value with respect to the motor 30 that drives the second pump 28 on the basis of the determination result in the output determination unit 26c and the determination result in the workload determination unit 26e, and outputs a control signal based on the set command value to the driver 32. For example, if the output determination unit 26c determines that the operation point decided in the operation point decision unit 26b is beyond the discharging capability of the second pump 28, the pump controller 26f sets a command value so as to stop the motor 30 or decrease the rotation number Nem, that is, the command value so as to stop the second pump 28 or decrease the rotation number Nep, and supplies the control signal based on the set command value to the driver 32. For example, if the workload determination unit 26e determines that the amount of workload loss is more than the amount of workload cut, the pump controller 26f sets the command value so as to stop the motor 30 or decrease the rotation number Nem and supplies the control signal based on the set command value to the driver 32.

The diagnosis unit 26g diagnoses the state of each part of the vehicle 14 including the hydraulic control device 10 and the transmission 12 on the basis of the detection results from the above sensors and the driver's intention (for example, the driver's operation on the accelerator pedal).

Since the transmission 12 is a known continuously variable transmission, detailed description thereof is not given herein.

2. Operation of the Present Embodiment

An operation of the hydraulic control device 10 according to the present embodiment with the above structure will be described with reference to FIG. 2 to FIG. 7. Here, description is given concerning a process inside the control unit 26 in order to avoid the deterioration in fuel efficiency of the vehicle 14, prevent the hunting of the check valve 52, and suppress the variation in pressure of the oil to be supplied to the continuously variable transmission mechanism 50 by determining whether the operation point of the second pump 28 based on the request output depending on the vehicle state is in the range of the discharging capability of the second pump 28, and on the basis of the determination result, controlling the driving of the second pump 28.

<2.1 Description of Operation in FIG. 2 to FIG. 6C>

Figure 2:
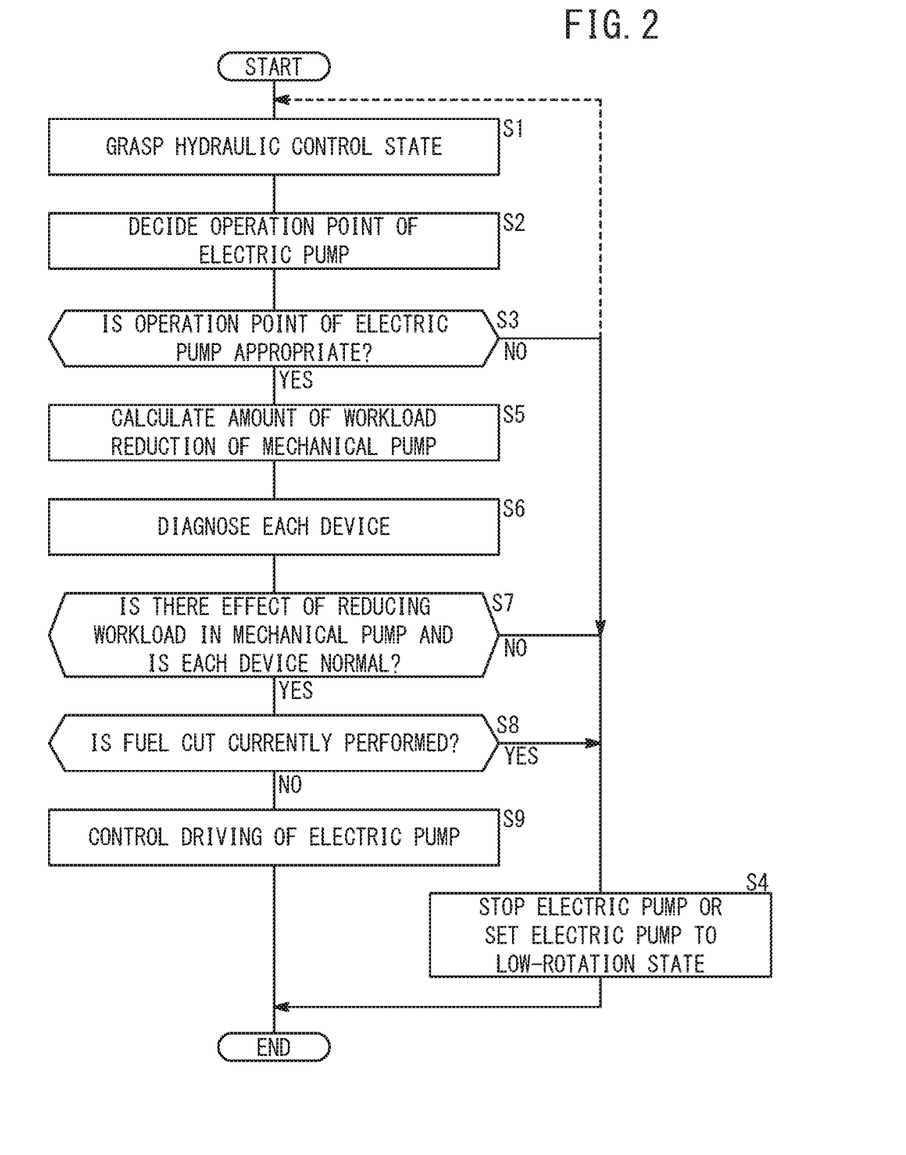
FIG. 2 is a flowchart expressing an operation of the hydraulic control device in FIG. 1.

FIG. 2 is a flowchart for describing the operation of the hydraulic control device 10. Here, the description is given with reference to FIG. 1 as necessary. Note that the process in FIG. 2 is repeatedly performed at predetermined time intervals.

In step S1 in FIG. 2, the vehicle state grasping unit 26a grasps various vehicle states of the vehicle 14 including the hydraulic control state regarding a hydraulic system in the transmission 12. As described above, the detection signals are sequentially input from the various sensors in the vehicle 14 to the control unit 26. Thus, by using the lateral pressure (pulley pressure) as the command value, the vehicle state grasping unit 26a estimates the line pressure PH based on the command value. The vehicle state grasping unit 26a estimates the pressure P3 in consideration of the operation status of the hydraulic operation unit of the low-pressure system, such as the lockup clutch 88. In addition, the vehicle state grasping unit 26a estimates the flow rate of the second oil (flow rate for shift) to be supplied to the continuously variable transmission mechanism 50 in the shift operation or the leak amount of the oil in the hydraulic system in the transmission 12 on the basis of the lateral pressure corresponding to the command value, for example.

Figure 3:
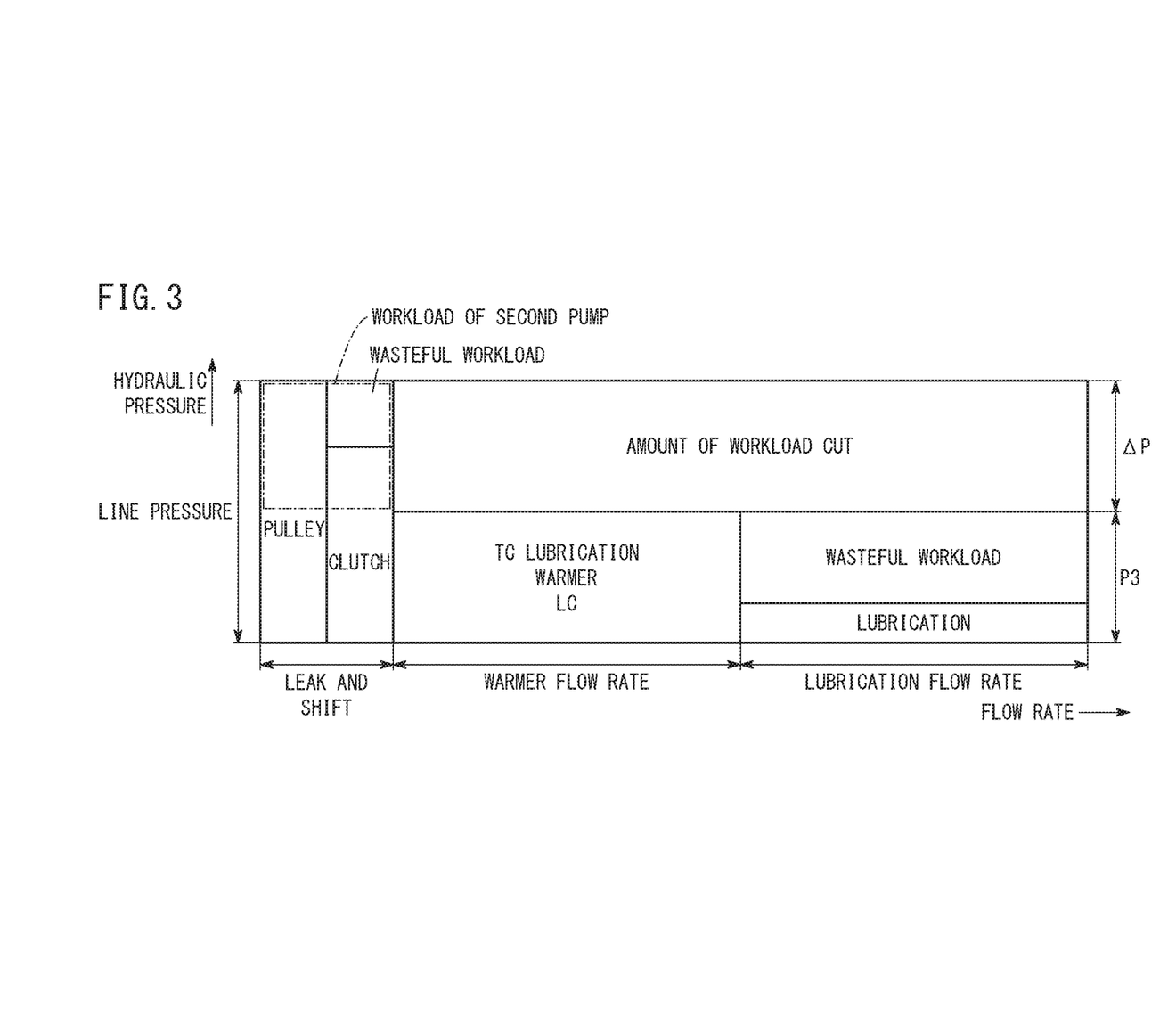
FIG. 3 is an explanatory diagram schematically illustrating workloads of the hydraulic control device in FIG. 1.

In the next step S2, the operation point decision unit 26b calculates the differential pressure ΔP (ΔP=PH−P3) by subtracting the pressure P3 from the line pressure PH estimated by the vehicle state grasping unit 26a. That is to say, if the second pump 28 supplies the second oil to the continuously variable transmission mechanism 50, as illustrated in FIG. 3, it is necessary for the second pump 28 to pressurize the first oil with the pressure P3 up to the line pressure PH and to discharge the first oil that is pressurized as the second oil. Therefore, in order to decide the operation point of the second pump 28, the operation point decision unit 26b calculates a differential pressure ΔP between the line pressure PH and the pressure P3 as a request discharging pressure (request output) for the second pump 28. Note that it is desirable that the operation point decision unit 26b calculate the differential pressure ΔP by adding a margin pressure that can control the pulley pressure to the line pressure PH estimated by the vehicle state grasping unit 26a. The details of each workload in FIG. 3 will be described below.

Figure 4:
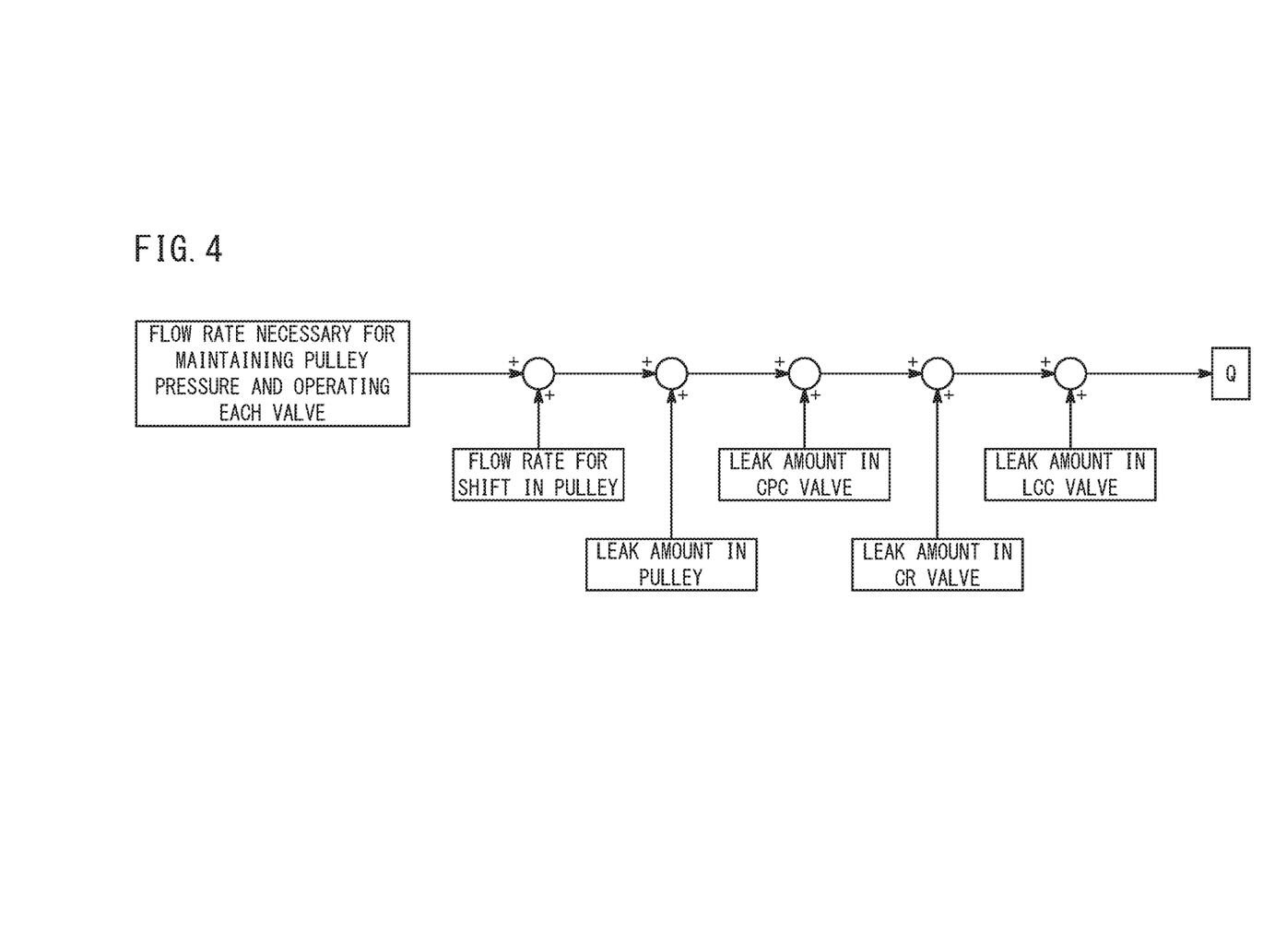
FIG. 4 is an explanatory diagram illustrating a method of calculating a necessary flow rate.

In step S2, next, the operation point decision unit 26b calculates a necessary flow rate Q as the request discharging amount (request output) that should be discharged from the second pump 28 by summing up the leak amount and the flow rate for shift estimated in the vehicle state grasping unit 26a. FIG. 4 is an explanatory diagram illustrating a method of calculating the necessary flow rate Q in the operation point decision unit 26b.

The operation point decision unit 26b calculates the necessary flow rate Q by adding the leak amount and the flow rate for shift estimated in the vehicle state grasping unit 26a, that is, "FLOW RATE FOR SHIFT IN PULLEY", "LEAK AMOUNT IN PULLEY", "LEAK AMOUNT IN CPC VALVE", "LEAK AMOUNT IN CR VALVE", and "LEAK AMOUNT IN LCC VALVE" in FIG. 4 to the flow rate necessary to maintain each pulley pressure of the driven pulley 50a and the driving pulley 50b, and the flow rate necessary for the operation of each valve in the transmission 12. That is to say, in the case where the second pump 28 supplies the second oil to the continuously variable transmission mechanism 50 and the like, the operation point decision unit 26b calculates the necessary flow rate Q by summing up the flow rate of the second oil to be supplied to a supply target such as the continuously variable transmission mechanism 50 and the leak amount generated in a route in the middle of the supply.

Figure 5A:
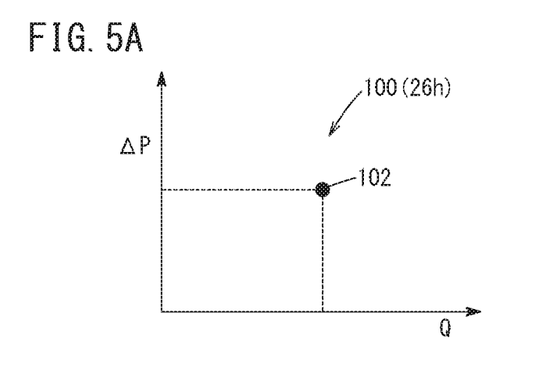
FIG. 5A is a diagram showing a first map.

By using the differential pressure ΔP and the necessary flow rate Q obtained in this manner, the operation point decision unit 26b decides the operation point of the second pump 28 with reference to the map stored in the map storage unit 26h. The map in FIG. 5A is a first map 100 expressing a relation between the differential pressure ΔP and the necessary flow rate Q. On the first map 100, the operation point decision unit 26b decides as an operation point 102, a place corresponding to the obtained differential pressure ΔP and necessary flow rate Q.

Figure 5B:
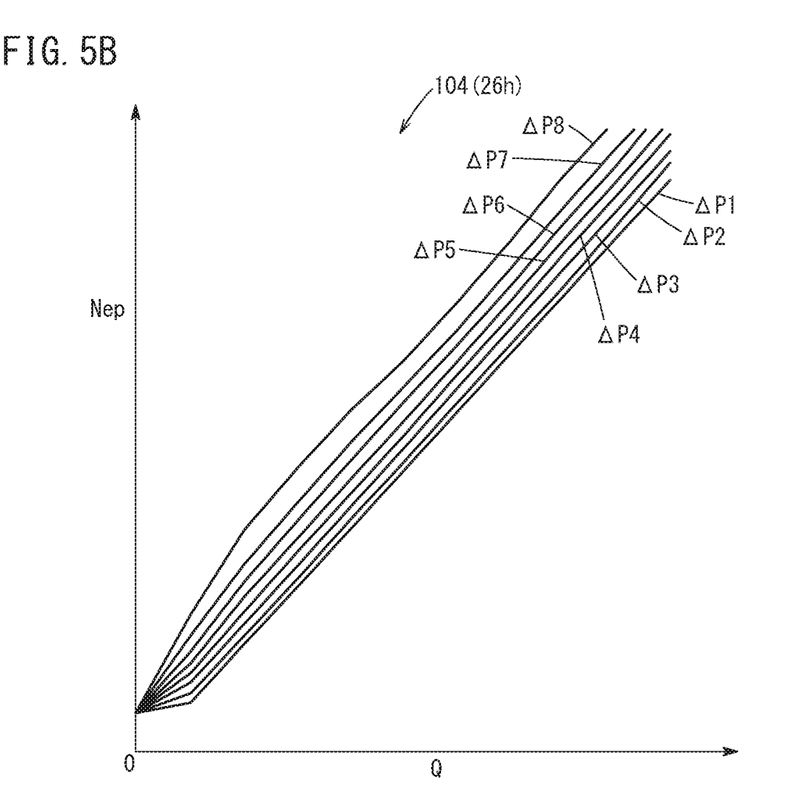
FIG. 5B is a diagram showing a second map.

The map in FIG. 5B is a second map 104 expressing a relation between the differential pressure ΔP and the rotation number Nep of the second pump 28. The second map 104 shows characteristic lines each expressing the relation between the differential pressure ΔP and the rotation number Nep for each different differential pressure ΔP (ΔP1<ΔP2< . . . <ΔP7<ΔP8). Therefore, the operation point decision unit 26b can specify the command value of the rotation number Nep of the second pump 28 based on the operation point 102 from the operation point 102 (the differential pressure ΔP and the necessary flow rate Q based on the operation point 102) that is decided using the first map 100. Note that since the pump controller 26f generates the control signal for the driver 32, the pump controller 26f may perform the process of specifying the command value using the second map 104 in FIG. 5B.

Figure 6A:
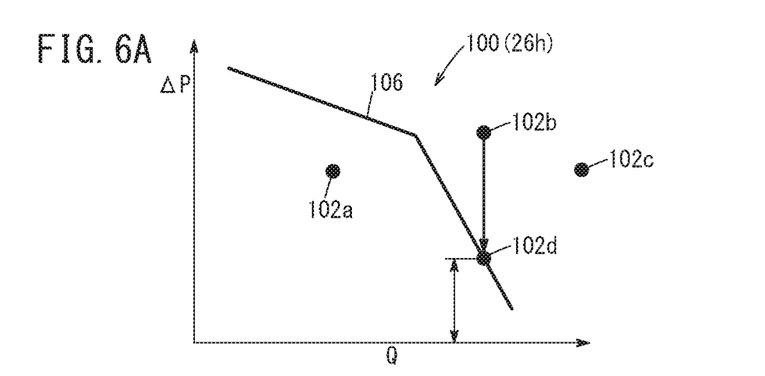
FIG. 6A to FIG. 6C are diagrams showing the first map.

In the next step S3, the output determination unit 26c determines whether the operation point 102 decided in the operation point decision unit 26b is appropriate with reference to the first map 100. FIG. 6A is a diagram showing a determination process using the first map 100. A polygonal line shown on the first map 100 is a discharging capability limit line 106 indicating a limit of the discharging capability of the second pump 28. Therefore, if the operation point 102 exists inside the discharging capability limit line 106 (the differential pressure ΔP and the necessary flow rate Q that are lower than the discharging capability limit line 106), it is possible to determine that the second pump 28 can be driven at the operation point 102.

In FIG. 6A, an operation point 102a is inside the discharging capability limit line 106. Therefore, the output determination unit 26c determines that the second pump 28 can be driven at the operation point 102a, that is, the operation point 102a is appropriate (step S3: YES).

On the other hand, in FIG. 6A, operation points 102b, 102c are both outside the discharging capability limit line 106. In this case, the output determination unit 26c determines that the second pump 28 cannot be driven at the operation points 102b, 102c decided by the operation point decision unit 26b, that is, the operation points 102b, 102c are inappropriate (step S3: NO).

In response to this negative determination result, the output determination unit 26c examines whether the operation points 102b, 102c come within the range of the discharging capability limit line 106 by adjusting the differential pressure ΔP.

In regard to the operation point 102b, it is possible for the operation point 102b to reach the discharging capability limit line 106 by reducing the differential pressure ΔP. Therefore, the output determination unit 26c determines that the second pump 28 can be driven if the request output is less than the initial request output (low-rotation state). Accordingly, the output determination unit 26c changes the operation point 102b to an operation point 102d with a smaller request output.

On the other hand, in regard to the operation point 102c, it is impossible for the operation point 102c to reach the discharging capability limit line 106 even if the differential pressure ΔP is reduced. That is to say, the output determination unit 26c determines that, with this request output, the second pump 28 cannot be driven even if the differential pressure ΔP is adjusted.

Figure 6B:
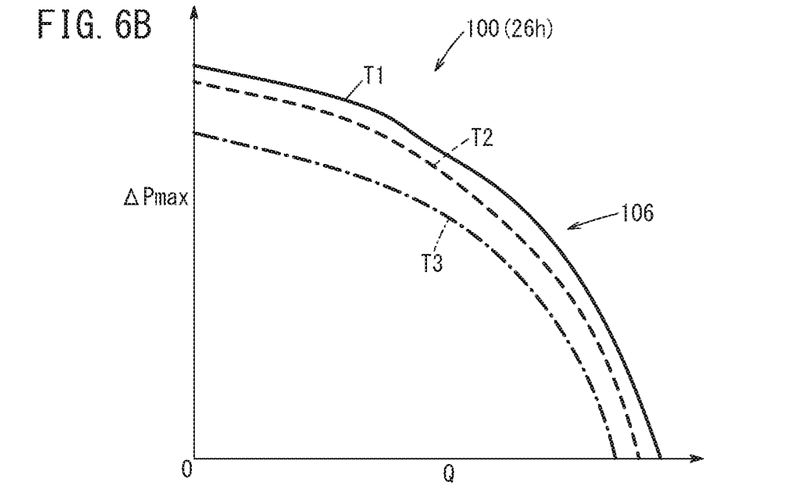

Note that as illustrated in FIG. 6B, the discharging capability limit line 106 varies depending on the oil temperature To (different oil temperatures T1<T2<T3). Therefore, in the above determination process in step S3, the determination process for the operation points 102, 102a to 102c is performed in consideration of the oil temperature To.

Figure 6C:
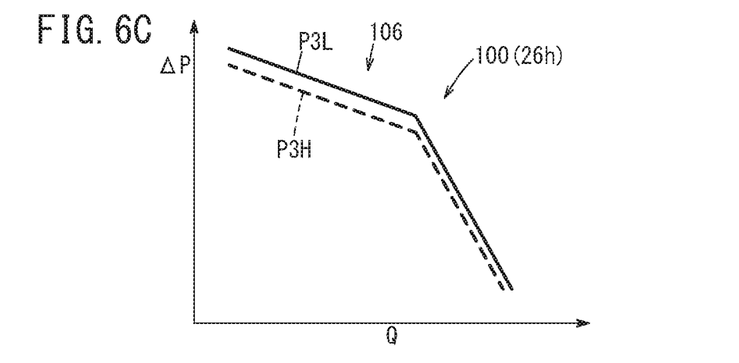

In addition, as illustrated in FIG. 6C, the discharging capability limit line 106 also varies depending on the pressure P3. That is to say, even if the differential pressure ΔP is the same, as the pressure P3 becomes higher, the line pressure PH as an absolute pressure becomes higher and the volume efficiency of the second pump 28 decreases. As a result, as shown in FIG. 6C, as the pressure P3 changes from P3L to P3H (P3L<P3H), the discharging capability limit line 106 shifts inward. Therefore, when the operation point 102 is decided, the different map in which the pressure P3 is also taken into consideration is referred to, or the operation point 102 is obtained by the correction through calculation.

If the determination result in step S3 is negative (step S3: NO), the process advances to the next step S4. In step S4, the pump controller 26f determines that the second pump 28 cannot be driven at the operation point 102c decided by the operation point decision unit 26b or that the second pump 28 should be driven in the low-rotation state on the basis of the operation point 102d adjusted by the output determination unit 26c. Then, the pump controller 26f ignores the operation point 102c and stops the second pump 28, or supplies to the driver 32 the control signal that instructs to operate the second pump 28 in the low-rotation state on the basis of the operation point 102d after the adjustment.

On the basis of the supplied control signal, the driver 32 stops the motor 30 or controls the motor 30 so as to be in the low-rotation state. Thus, the second pump 28 stops or is operated in the low-rotation state. As a result, as the flow rate of the second oil decreases (the pressure of the second oil decreases), the check valve 52 is opened, so that the first pump 20 supplies the first oil to the continuously variable transmission mechanism 50 through the check valve 52.

Note that if the determination result in step S3 is negative (step S3: NO), the process can return to step S1 as shown by a dashed line in FIG. 2, and the process in step S1 can be repeated as well.

On the other hand, if the determination result in step S3 is positive (step S3: YES), the process advances to the next step S5. In step S5, the workload calculation unit 26d calculates the amount of workload reduction in the first pump 20 that is reduced by the driving of the second pump 28.

Here, the workloads of the first pump 20 and the second pump 28 are described with reference to FIG. 3. As shown in FIG. 3 where the horizontal axis indicates the flow rate of the oil (first to third oil) and the vertical axis indicates the hydraulic pressure (pressure P3, line pressure PH), the hydraulic control device 10 requires the following flow rates (1) to (3) of the oil in order to perform the hydraulic control on the transmission 12.

(1) A flow rate of the oil to be supplied to the driven pulley 50a and the driving pulley 50b in the continuously variable transmission mechanism 50, and a flow rate of the oil to be supplied to the forward clutch 70a and the reverse brake clutch 70b. These flow rates correspond to the portion denoted as "LEAK AND SHIFT" in FIG. 3. In these flow rates, the "PULLEY" part corresponds to the flow rate of the oil to be supplied to the continuously variable transmission mechanism 50, and the "CLUTCH" part corresponds to the flow rate of the oil to be supplied to the forward clutch 70a and the reverse brake clutch 70b. These flow rates include the flow rate necessary in the shift operation in the transmission 12, and the leak amount in the valves and oil passages to the continuously variable transmission mechanism 50 and the forward clutch 70a and the reverse brake clutch 70b.

(2) A flow rate of the oil to be supplied to the torque converter 90 including the lockup clutch 88, and the oil warmer 82. This flow rate corresponds to the portion denoted as "WARMER FLOW RATE" in FIG. 3. This flow rate includes the leak amount in the valves and oil passages to the torque converter 90 and the oil warmer 82, and the flow rate of the oil to be supplied to the pulley shaft 50c, the bearing 50d, and the belt 50e that are connected to the downstream side of the oil warmer 82.

(3) A flow rate of the oil to be supplied to the lubrication system 84. This flow rate corresponds to the portion denoted as "LUBRICATION FLOW RATE" in FIG. 3. This flow rate includes the leak amount in the valves and oil passages to the lubrication system 84.

As described above, the pressures of the first to third oil change depending on whether the first pump 20 is operated alone or both the first pump 20 and the second pump 28 are operated.

When the first pump 20 is operated alone, it is necessary to supply the first oil from the first pump 20 to the continuously variable transmission mechanism 50 through the check valve 52; therefore, the pressure of the first oil is the line pressure PH (PH pressure). In this case, it is necessary that the first pump 20 supply the first oil to the continuously variable transmission mechanism 50 with the first oil pressurized up to the line pressure PH in which a differential pressure ΔP (ΔP=PH−P3) is added to the pressure P3 of the third oil (the pressure of the first oil before pressurized). In this case, the workload of the first pump 20 (a first workload) when the first pump 20 is operated alone is obtained by multiplying the line pressure PH by the "LEAK AND SHIFT", "WARMER FLOW RATE", and "LUBRICATION FLOW RATE". That is to say, the first workload is the workload corresponding to the discharging amount of the first pump 20. The output pressure sensor 24 detects the line pressure PH as the output pressure P1.

On the other hand, when both the first pump 20 and the second pump 28 are operated, it is only necessary that the first pump 20 supply the first oil to the second pump 28 through the oil passage 22; thus, the pressure of the first oil is reduced to the pressure P3. As a result, the second pump 28 pressurizes the first oil from the pressure P3 to the line pressure PH, and supplies the first oil that is pressurized to the continuously variable transmission mechanism 50 as the second oil. That is to say, the second pump 28 pressurizes the first oil by the differential pressure ΔP, and supplies the first oil to the continuously variable transmission mechanism 50 as the second oil. Note that the output pressure sensor 24 detects the pressure P3 as the output pressure P1.

The second pump 28 is a small-capacity electric pump, and performs the work of the portion drawn with the dash-dot line in FIG. 3. In this case, the workload of the second pump 28 is obtained by multiplying the differential pressure ΔP by the flow rate of "LEAK AND SHIFT".

In the transmission 12, the oil to be supplied to the continuously variable transmission mechanism 50 has the highest pressure, and the oil to be supplied to the forward clutch 70a and the reverse brake clutch 70b has the second highest pressure. Therefore, in the workload of the second pump 28 of FIG. 2, the block above "CLUTCH" is a wasteful workload for the second pump 28. That is to say, when the oil with the pressure equivalent to that to the continuously variable transmission mechanism 50 is supplied to the forward clutch 70a and the reverse brake clutch 70b, a loss due to the "WASTEFUL WORKLOAD" occurs.

When the second pump 28 is operated, the workload in the first pump 20 can be cut by the "AMOUNT OF WORKLOAD CUT" in FIG. 3. That is to say, the workload of the first pump 20 (a second workload) is obtained by multiplying the pressure P3 by the flow rates of "LEAK AND SHIFT", "WARMER FLOW RATE", and "LUBRICATION FLOW RATE".

Note that in the hydraulic operation unit of the low-pressure system in the transmission 12, the pressure of the oil to be supplied to the lubrication system 84 is the lowest. Therefore, in FIG. 3, the block between the "AMOUNT OF WORKLOAD CUT" and "LUBRICATION" in the second workload is a wasteful workload for the first pump 20. That is to say, when the oil with the pressure equivalent to that in the torque converter 90, the oil warmer 82, or the like is supplied to the lubrication system 84, a loss due to the "WASTEFUL WORKLOAD" still occurs. When the vehicle 14 cruises, the lateral pressure (pulley pressure) may be lower than the pressure P3. The present embodiment, however, will describe on the basis of the illustration in FIG. 3.

As described above, the battery 42 is charged with the power generated by the ACG 38 through the rectifier 40, and when the power is supplied from the battery 42 to the driver 32 and the motor 30 is driven under a control operation of the driver 32, the second pump 28 is operated. In this case, the ACG 38 loses a workload exceeding the power necessary to drive the motor 30 (the second pump 28). Therefore, the amount of power generated in the ACG 38 corresponds to the amount of workload loss related to the supply of the second oil by the second pump 28 (the workload of generating power by the ACG 38). As described above, since only the amount of power to be consumed in the second pump 28 is handled in the workload of generating the power by the ACG 38 in the present embodiment, the workload of generating the power by the ACG 38 is obtained as follows: (the workload of generating power by the ACG 38)=(the power consumed by the second pump 28)/(the power generation efficiency of the ACG 38).

Therefore, in step S5, the workload calculation unit 26d calculates the workload when the first pump 20 is operated alone (a first workload) and the workload of the first pump 20 when both the first pump 20 and the second pump 28 are operated (a second workload) in such a way that: the discharging flow rate of the first pump 20 is estimated on the basis of the engine rotation number New (the rotation number Nmp of the first pump 20) from the engine rotation number sensor 92, and the estimated discharging flow rate and the line pressure PH estimated by the vehicle state grasping unit 26a are multiplied. Alternatively, the workload calculation unit 26d may calculate the workload of the first pump 20 by using the engine rotation number New and the friction torque of the first pump 20.

Next, the workload calculation unit 26d estimates the power consumption (workload) of the second pump 28 (the motor 30) by using the operation point 102 of the second pump 28 that is estimated by the operation point decision unit 26b or using the torque and the rotation number Nep of the second pump 28 (the rotation number Nem of the motor 30). On the basis of the estimated power consumption of the second pump 28 and the power generation efficiency of the ACG 38, the workload calculation unit 26d estimates the amount of workload loss (power generation workload) of the ACG 38.

Next, the workload calculation unit 26d calculates the amount of workload reduction in the first pump 20 by subtracting the second workload and the amount of workload loss of the ACG 38 from the first workload.

In step S6, the diagnosis unit 26g diagnoses the state of each part in the vehicle 14 on the basis of the detection results of the various sensors in the vehicle 14. For example, the diagnosis unit 26g diagnoses the state of the battery 42 on the basis of the voltage V of the battery 42 that is detected by the voltage sensor 44 and the current I that is detected by the current sensor 46.

In step S7, the workload determination unit 26e determines whether the amount of workload reduction that is calculated in the workload calculation unit 26d is more than a predetermined threshold α and whether each part in the vehicle 14 is normal. If the amount of workload reduction is more than the predetermined threshold α and each part in the vehicle 14 is normal (step S7: YES), the workload determination unit 26e determines whether the fuel cut for the engine 16 is being performed on the basis of the opening of the accelerator pedal that is detected by the accelerator sensor 98 in the next step S8.

In the case where the fuel cut is not being performed (step S8: NO), at the time of reception of the determination result from the workload determination unit 26e, the pump controller 26f determines that the workload of the first pump 20 is reduced if the second pump 28 is operated at the operation point 102 that is decided by the operation point decision unit 26b, and thus, a control signal based on the operation point 102 is supplied to the driver 32 in the next step S9. Accordingly, the driver 32 can drive the motor 30 on the basis of the supplied control signal and can rotate the second pump 28.

On the other hand, if the determination result in step S7 is negative (step S7; NO), the process advances to step S4. In step S4, the pump controller 26f determines that the amount of workload reduction is less than or equal to the threshold α and the effect of reducing the workload of the first pump 20 by the operation of the second pump 28 cannot be obtained, or that some device in the vehicle 14 has an abnormality and appropriate hydraulic control for the transmission 12 cannot be performed. Then, the pump controller 26f ignores the operation point 102 decided by the operation point decision unit 26b and supplies the driver 32 with a control signal to instruct it to stop the second pump 28 or to operate the second pump 28 in a low-rotation state. In this case as well, on the basis of the supplied control signal, the driver 32 stops the motor 30 or controls the motor 30 so as to be in the low-rotation state. Thus, the second pump 28 stops or is operated in the low-rotation state.

Even if the determination result in step S7 is positive, the process advances to step S4 when the determination result in step S8 is positive (steps S7, S8: YES). In this case, though devices in the vehicle 14 are normal and the amount of workload reduction is more than the threshold α, the fuel cut is currently being performed; therefore, the pump controller 26f determines that the improvement of the fuel efficiency thanks to the fuel cut may be canceled out by the amount of workload loss of the ACG 38 etc. That is to say, in the case where the fuel cut is performed, the fuel is consumed in smaller quantity, so that the first pump 20 is burdened less. Therefore, it is difficult to further reduce the workload of the first pump 20. Even in this case, the pump controller 26f performs the process in step S4 and stops the second pump 28 or operates the second pump 28 in the low-rotation state.

Figure 7:
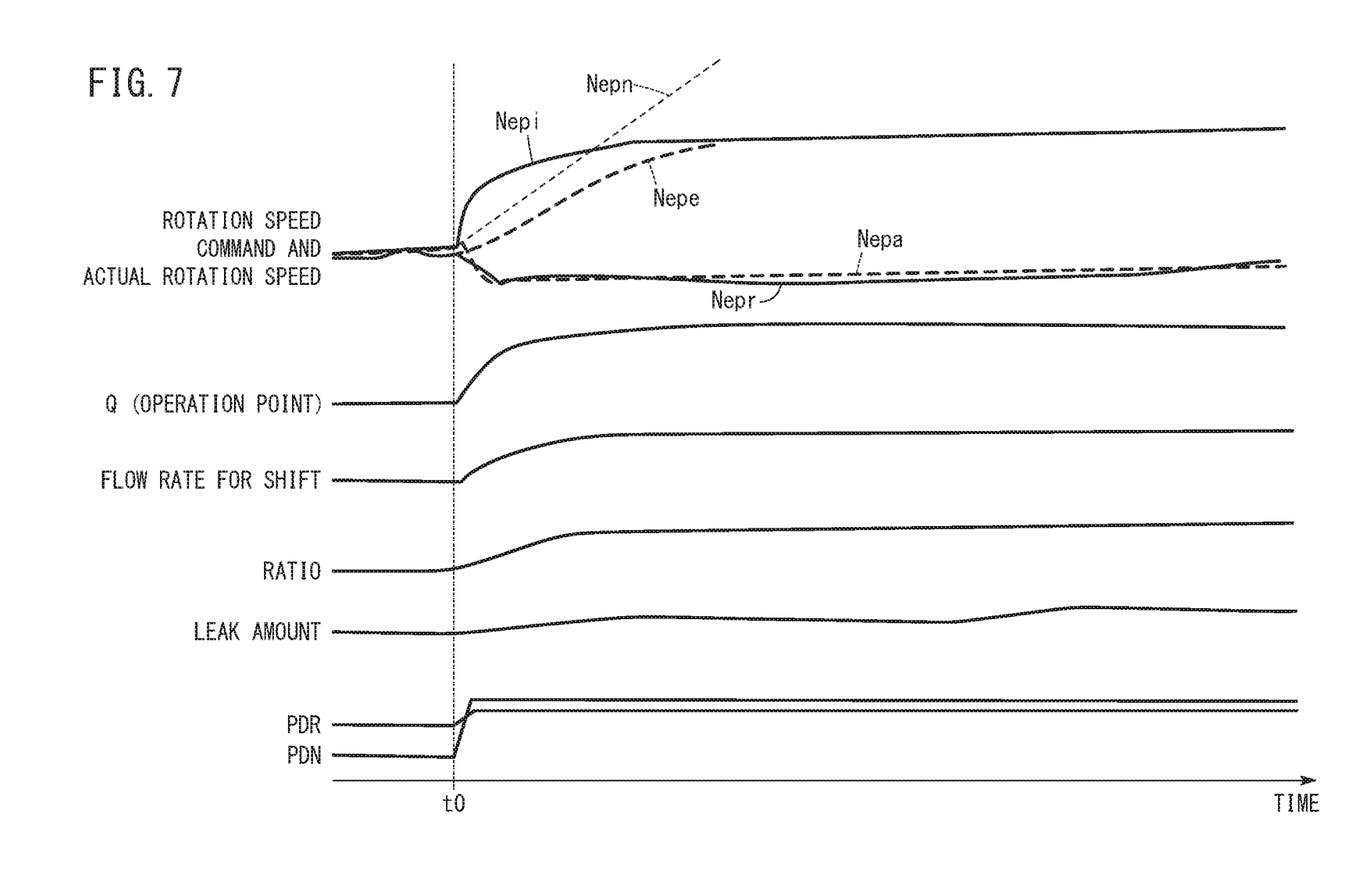
FIG. 7 is a timing chart expressing how an operation point and the like change as time elapses.

<2.2 Description of Operation in FIG. 7>

FIG. 7 is a timing chart expressing how the operation point 102 and the like change over time. Differently from the operation in FIG. 2 to FIG. 6C, FIG. 7 shows a case in which the operation point 102 and the like change as time elapses when the pulley pressure (DN pressure) PDN of the driven pulley 50a and the pulley pressure (DR pressure) PDR of the driving pulley 50b change.

In this case, when the driver of the vehicle 14 pushes down on the accelerator pedal, the pulley pressure PDN of the driven pulley 50a and the pulley pressure PDR of the driving pulley 50b increase from a time point t0 in accordance with the opening of the accelerator pedal, and then, each pressure is maintained at a fixed value.

In accordance with the change of each pulley pressure PDN, PDR, the leak amounts in the oil passage and each valve in the transmission 12 and the ratio (shift ratio) of the driven pulley 50a and the driving pulley 50b increase or decrease as time elapses. In addition, the flow rate for shift in the continuously variable transmission mechanism 50 increases or decreases in accordance with the change in ratio as time elapses. As a result, the necessary flow rate Q changes in accordance with the change in flow rate for shift as time elapses. Therefore, the operation point 102 changes randomly as the driver pushes down on the accelerator pedal. In the example of FIG. 7, the necessary flow rate Q changes toward the discharging capability limit line 106 (the direction of increasing the necessary flow rate Q in FIG. 6A).

As the operation point 102 changes, a command value Nepi of the rotation number Nep of the second pump 28 also changes (see FIG. 5B). That is to say, the command value Nepi is a command value for the ideal rotation number Nep, and follows the change of the request output over time. The command value Nepi increases as the necessary flow rate Q increases and as time elapses. However, since the second pump 28 is an electric pump that rotates by the driving of the motor 30, a time delay relative to the command value Nepi occurs in an actual rotation number Nepe (response performance of the second pump 28) that is predicted from the ideal command value Nepi.

Here, assuming that the minimum necessary rotation number to discharge the second oil is Nepn, the actual rotation number Nepe increases with a delay from the rotation number Nepn. Therefore, even if the motor 30 is driven by the supply of the control signal to the driver 32 based on the ideal command value Nepi so as to rotate the second pump 28, the rotation number Nepe cannot follow the command value Nepi; therefore, the output determination unit 26c determines that it is difficult for the second pump 28 to discharge the second oil at the necessary flow rate Q.

Then, on the basis of the determination result in the output determination unit 26c, instead of rotating the second pump 28 with the ideal rotation number Nepe, the pump controller 26f corrects the change of the rotation number Nepe to a rotation number Nepa to achieve a low-rotation state and supplies the control signal based on the corrected rotation number Nepa to the driver 32. Thus, the second pump 28 rotates at a rotation number Nepr that follows the corrected rotation number Nepa. That is to say, in the example of FIG. 7, the change of the request output over time is more than the response performance of the second pump 28 like in a case where high pressure oil is requested to be supplied to the driven pulley 50a or a case where a quick shift operation is requested. Therefore, the second pump 28 is stopped or rotated in the low-rotation state.

3. Effect of the Present Embodiment

As described above, in the hydraulic control device 10 according to the present embodiment, if the request output is beyond the discharging capability of the second pump 28, the second pump 28 is stopped or the rotation number Nep is decreased; therefore, the oil can be supplied as appropriate to the continuously variable transmission mechanism 50 and the like in accordance with the vehicle state. Thus, the deterioration in fuel efficiently of the vehicle 14 can be avoided.

In addition, if the request output is beyond the discharging capability, the first pump 20 supplies the first oil to the continuously variable transmission mechanism 50 through the check valve 52 to make up for the shortage with respect to the request output. In this case, the second pump 28 is stopped or set to the low-rotation state. Therefore, the hunting of the check valve 52 is prevented and the variation in pressure of the oil to be supplied to the continuously variable transmission mechanism 50 can be suppressed.

Moreover, if the operation point 102 is over the discharging capability limit line 106, the second pump 28 is stopped or set to the low-rotation state; therefore, the second pump 28 can be operated as appropriate in accordance with the request output.

Furthermore, the operation point decision unit 26b calculates the differential pressure $\Delta P$ using the line pressure PH and the pressure P3, and calculates the necessary flow rate Q by adding the leak amount of the oil in the continuously variable transmission mechanism 50 and the leak amount of the oil between the second pump 28 and the continuously variable transmission mechanism 50 to the flow rate of the oil requested by the continuously variable transmission mechanism 50 (flow rate for shift). Therefore, the output determination unit 26c can perform the determination process accurately.

In addition, a plurality of discharging capability limit lines 106 for the oil temperatures To of the second oil are provided in the first map 100, and the output determination unit 26c determines whether the operation point 102 is over the discharging capability limit lines 106 based on the oil temperature To of the second oil at the operation point 102. Thus, the determination process can be performed as appropriate in accordance with the oil temperature To. In the present embodiment, the determination process is performed using the first map 100; however, the determination process may employ the calculation using an approximate expression or the calculation considering the volume efficiency or machine efficiency.

Note that the discharging capability limit line 106 changes depending on the pressure P3 of the third oil; therefore, by taking the pressure P3 into consideration, the operation point 102 can be decided suitably.

Furthermore, the output determination unit 26c determines whether the change of the request output over time is more than the response performance of the second pump 28 and if the output determination unit 26c determines that the change of the request output over time is beyond the discharging capability, the pump controller 26f stops the second pump 28 or decreases the rotation number Nep. Therefore, even if the request output changes, the second pump 28 can be operated as appropriate in accordance with the request output.

The hydraulic control device 10 according to the present embodiment can also obtain the effect below.

If the amount of workload loss of the ACG 38 is more than the amount of workload cut in the first pump 20, driving the second pump 28 may deteriorate the fuel efficiency of the vehicle 14. In this case, the motor 30 is stopped or the rotation number Nem is decreased, so that the second pump 28 is stopped or set to the low-rotation state. Thus, the second pump 28 is operated normally only when it is expected that the fuel efficiency is improved. As a result, the second oil can be supplied efficiently to the continuously variable transmission mechanism 50 or the like without deteriorating the fuel efficiency. In addition, since the second pump 28 is not driven wastefully, abrasion of the rotating parts of the second pump 28 or deterioration of durability can be suppressed.

The workload calculation unit 26d calculates the amount of workload cut by subtracting the second workload and the workload of the second pump 28 from the first workload of the first pump 20; thus, the workload determination unit 26e can perform the determination process accurately.

Specifically, the workload calculation unit 26d calculates the amount of workload reduction in the first pump 20 based on the amount of workload cut by subtracting the second workload and the amount of workload loss from the first workload, and the workload determination unit 26e determines whether the amount of workload reduction is more than the predetermined threshold α. If the workload determination unit 26e determines that the amount of workload reduction is less than or equal to the threshold α, the pump controller 26f stops the motor 30 or decreases the rotation number Nem (Nep). By setting the threshold α in this manner, the workload determination unit 26e can perform the determination process accurately in consideration of a certain degree of margin.

In addition, even if the amount of workload loss is less than or equal to the amount of workload cut, the pump controller 26f may stop the motor 30 or decrease the rotation number Nem (Nep) of the motor 30 when the fuel cut for the engine 16 is performed. Thus, it is possible to prevent the driving of the second pump 28 from canceling out the improvement of the fuel efficiency by the fuel cut.

The present invention is not limited to the above embodiment and may employ various structures on the basis of the description in the present specification.

What is claimed is:

1. A hydraulic control device including, between a first pump and a hydraulic operation unit of a transmission, a second pump and a check valve connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil, the hydraulic control device comprising:
 a vehicle state grasping unit configured to grasp a vehicle state of a vehicle including the transmission;
 an output determination unit configured to determine whether a request output for the second pump depending on the vehicle state is beyond a discharging capability of the second pump; and
 a pump controller configured to stop the second pump or decrease a rotation number of the second pump if the output determination unit determines that the request output is beyond the discharging capability.

2. The hydraulic control device according to claim 1, further comprising an operation point decision unit configured to calculate a request discharging pressure corresponding to a request value of a discharging pressure of the second pump and a request flow rate corresponding to a request value of a flow rate of the second oil on a basis of the vehicle state, and decide an operation point of the second pump based on the request discharging pressure and the request flow rate corresponding to the request output by using a map expressing a relation between the discharging pressure and the flow rate, wherein:
 the output determination unit is configured to determine whether the operation point is over a discharging capability limit line corresponding to a limit line of a range where the second pump can be operated in the map; and
 the pump controller is configured to stop the second pump or decrease the rotation number of the second pump if the output determination unit determines that the operation point is over the discharging capability limit line.

3. The hydraulic control device according to claim 2, wherein the operation point decision unit is configured to calculate the request discharging pressure on a basis of a pressure of oil to be supplied to the hydraulic operation unit, and a pressure of the first oil, and calculate the request flow rate by adding a leak amount of the oil in the hydraulic operation unit and a leak amount of the oil between the second pump and the hydraulic operation unit to the flow rate of the oil requested by the hydraulic operation unit.

4. The hydraulic control device according to claim 2, wherein:
 the map includes a plurality of discharging capability limit lines depending on oil temperatures of the second oil; and
 the output determination unit is configured to determine whether the operation point is over the discharging capability limit line depending on the oil temperature of the second oil at the operation point.

5. The hydraulic control device according to claim 2, wherein the discharging capability limit line is configured to change depending on a pressure of third oil to be supplied from the first pump to another hydraulic operation unit that is lower in pressure than the hydraulic operation unit.

6. The hydraulic control device according to claim 1, wherein:
 the output determination unit is configured to determine whether a change of the request output over time is more than response performance of the second pump; and
 if the output determination unit determines that the change of the request output over time is more than the response performance, the pump controller is configured to stop the second pump or decrease the rotation number of the second pump.

* * * * *